United States Patent
Lewin

(10) Patent No.: US 6,556,973 B1
(45) Date of Patent: Apr. 29, 2003

(54) CONVERSION BETWEEN DATA REPRESENTATION FORMATS

(75) Inventor: Erland Lewin, Stockholm (SE)

(73) Assignee: Voxi AB, Stockholm (SE)

( * ) Notice: Subject to any disclaimer, the term of this patent is extended or adjusted under 35 U.S.C. 154(b) by 0 days.

(21) Appl. No.: 09/551,997

(22) Filed: Apr. 19, 2000

(51) Int. Cl.$^7$ .......................... G10L 21/06; G06F 17/27
(52) U.S. Cl. ............................ 704/277; 704/275; 704/9
(58) Field of Search ..................... 704/8, 9, 10, 231, 704/235, 251, 260, 277, 275; 707/100, 4; 706/45; 717/145

(56) References Cited

U.S. PATENT DOCUMENTS

| | | | | |
|---|---|---|---|---|
| 4,502,128 A | * | 2/1985 | Okajima et al. ............... 704/8 |
| 4,873,634 A | * | 10/1989 | Frisch et al. .................. 704/8 |
| 5,200,893 A | | 4/1993 | Ozawa et al. ............... 707/531 |
| 5,237,502 A | | 8/1993 | White et al. ................... 704/1 |
| 5,386,556 A | | 1/1995 | Hedin et al. .................. 707/4 |
| 5,386,557 A | * | 1/1995 | Boykin et al. .............. 717/145 |
| 5,530,863 A | | 6/1996 | Hino .......................... 717/146 |
| 5,715,368 A | | 2/1998 | Saito et al. ................. 704/268 |
| 5,737,242 A | * | 4/1998 | Madre et al. ................. 706/45 |
| 5,740,421 A | * | 4/1998 | Palmon ...................... 707/100 |
| 5,960,384 A | * | 9/1999 | Brash ......................... 704/10 |
| 5,966,686 A | * | 10/1999 | Heidorn et al. ............... 704/9 |
| 6,098,034 A | * | 8/2000 | Razin et al. .................. 704/9 |
| 6,233,546 B1 | * | 5/2001 | Datig ........................... 704/9 |

FOREIGN PATENT DOCUMENTS

DE  19626142  1/1998  ........... G06F/17/28

* cited by examiner

*Primary Examiner*—Doris H. To
*Assistant Examiner*—Dan Nolan
(74) *Attorney, Agent, or Firm*—Jones Day

(57) ABSTRACT

A method and apparatus for conversion between data representation formats and data including sound and text information are disclosed. Data representation formats include a string of characters in the text format, a digital representation of an acoustic wave form in the sound format, a reference to a data structure containing information about a word in the word format, a tree-like representation of the grammatical structure of the phrase in the phrase format and references to functions, objects and attributes in an underlying data model in the logic format. Software for a computer or a combination of hardware and software may be used as well as word and sound processors.

20 Claims, 1 Drawing Sheet

CONVERSION BETWEEN DATA REPRESENTATION FORMATS

TECHNICAL FIELD

The present invention pertains to a method and an arrangement for conversion between data representation formats, said data comprising sound or text information. The invention specifically provides for a method and arrangement means for word and sound processing.

BACKGROUND ART

Natural language understanding has been the topic of research since the first days of Artificial Intelligence. The present invention is primarily intended for understanding spontaneous utterances, in written or spoken form, within a limited domain.

One current approach to this problem is to model a dialog flow for each operation that can be performed in a specific system, dividing each dialog into modes. For each mode, valid inputs and their consequences are listed. For example, the Philips SpeechMania® 99 product has been demonstrated with a pizza ordering application, where a user goes through dialog modes involving for instance selecting pizza toppings. A disadvantage of this type of technology is that the system will only understand the utterances expected in a given mode. If a user changes his drink order while he is expected to select pizza toppings, the system may fail to understand this. The degree to which the system 'understands' the utterances in this kind of iteration is limited; each mode and the utterances valid therein must be anticipated by the developers, and directly related to the action the system takes as a response to user input.

Other speech recognition systems, such as those using the Java™ Speech Grammar Format (JSGF), provide tags attached to an (often handwritten) grammar. The tags normally have some semantic meaning, regardless of how that semantic meaning was expressed. Words or phrases without semantic interest to the application (politeness phrases, articles, etc.) are ignored. Such an application then has a very simple parsing of the tags in order to act on the speech input. This requires manual adaptation of the application and grammar so that they work together, and cannot be said to 'understand' the spoken utterances.

More advanced approaches to natural language understanding make use of formalisms developed within the field of linguistics and computational linguistics. One currently popular formalism is Head-Driven Phrase Structure Grammars, which associates groups of lexical features with words, resulting in a grammar structure which can be used for parsing general natural language. Many of these linguistic formalisms could be used to perform some of the steps described in the present invention, but require much more work to be integrated into a complete language understanding interface to an application, and also substantial adaptation to new domains.

Some speech recognition systems use word spotting. This entails listening for certain key words and ignoring the rest of the spoken utterance. This may simplify the parsing component of a system, but does not allow the system to understand the details of the user's utterance.

No commercial applications use the same grammar for both natural language generation and natural language understanding. Most current applications either understand a very simple subset of natural language, or require substantial manpower to adapt the natural language understanding system to a given application.

SUMMARY OF THE DISCLOSED INVENTION

The present invention sets forth a method and an arrangement for word and sound processing. It solves the problem of simple natural language understanding, allowing users to interact with (for instance by giving commands and asking questions) machines using natural language, for instance in spoken or written form. Additionally, the method provides language independence by transforming linguistic utterances by the user to a semantic form which is independent of the original language used. This form may later be converted into another human language, thereby resulting in a simplistic translation. Furthermore, the present invention can automate the process of adapting domain specific natural language understanding to an application of the same.

The present invention does not attempt to solve the highly complex problem of general natural language understanding, but rather the understanding of a limited subset of natural language—utterances which can be straight forwardly mapped to the domain of one or several data models or computer applications.

To achieve these aims and objectives, the present invention provides a method for conversion between data representation formats, where the data includes sound or text information. The data representation formats are text, sound, words, phrases, and logic. Those are combined as conversions between text or sound to words or vice versa, words to phrases or vice versa, and phrases to logic or vice versa. The formats include a string of characters in the text format, a digital representation of an acoustic wave form in the sound format, a reference to a data structure containing information about a word in the word format, a tree-like representation of grammatical structure of a phrase in the phrase format, where the leaf nodes of the tree-like representation are referenced to meanings of constituent words and conjunction information, and references to function, objects and attributes in an underlying data model in the logic format. The method includes the steps of converting text to words by using characters with separate words, converting words to text by concatenating the spelling of the constituent words, converting sounds to words by providing a continuous speech recognition system, converting words to sounds by providing a speech synthesis system, converting words to phrases by parsing, converting phrases to words by transversing the tree-like representation preferably from left to right and converting each leaf node to a word, converting phrases to logic by resolving or binding verb phrases to functions and noun phrases to objects in the underlying data model and converting logic to phrases by using knowledge of the grammar of the language used to create a phrase expressing the same semantics as in the original logic format.

The method further comprises:

converting text to words by using characters which separate words;

converting words to text by concatenating the spelling of the constituent words;

converting sound to words by providing a continuous speech recognition system;

converting words to sound by providing a speech synthesis system;

converting words to phrases by parsing converting phrases to words by traversing said tree-like representation preferably from left to right and convert each leaf node to a word;

converting phrases to logic by resolving or binding verb phrases to functions and noun phrases to objects in said underlying data model;

converting logic to phrases by using knowledge of the grammar of the used language to create a phrase expressing the same semantics as the original logic form; and thus providing a computer word processing and sound processing means.

The invention here also includes the apparatus for accomplishing the conversion. There are means for converting text to words, words to text, sounds to words, words to sounds, words to phrases, phrases to words, phrases to logic and logic to phrases, typically in form of software or a combination of hardware and software.

The arrangement further comprises:

converting means from text to words, which uses characters which separate words;

converting means from words to text, which concatenates the spelling of the constituent words;

converting means for sounds to words, providing a continuous speech recognition system;

converting means for words to sound, providing a speech synthesis system;

converting means for words to phrases, which uses parsing;

converting means for phrases to words, which traverses said tree-like representation preferably from left to right and converts each leaf node to a word;

converting means for phrases to logic, which resolves or binds verb phrases to functions and noun phrases to objects in said underlying data model; and converting means for logic to phrases, which uses knowledge of the grammar of the used language to create a phrase expressing the same semantics as the original logic form.

Further embodiments of the present invention are set out through the attached dependent claims. Also, said arrangement is able to provide the embodiments relating to said method.

BRIEF DESCRIPTION OF THE DRAWINGS

Henceforth reference is had to the attached figures for a better understanding of the present invention and its examples and embodiments, wherein.

DETAILED DESCRIPTION OF PREFERRED EMBODIMENTS

The present invention relates to how information can be converted between data representation formats. The conversions can be done using known techniques, where the uniqueness lies in the way the present invention is used and how to combine representations, and the conversions between them.

Figure 1:
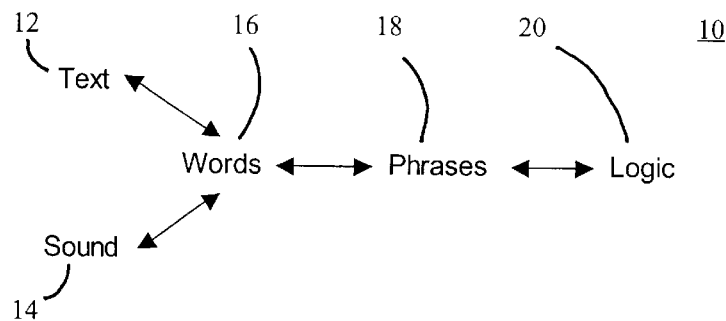
FIG. 1 is a diagrammatic illustration of conversions between reorientations according to the present invention.

FIG. 1 illustrates conversions 10 between representations 12, 14, 16, 18, 20 according to the present invention, whereby the arrows represent the conversions.

Provided below is an explanation of the representations corverted between. As an example, the phrase "print the file" will be used.

The format text 12 depicts a string of characters, such as "print the file", and sound 14 is a digital representation of an acoustic waveform. A digital recording of a person or a speech synthesizer saying "print the file" would be such a representation.

The format words 16 is a reference to a data structure containing information about a word, such as its spelling, pronunciation and meanings. In the "words" representation, the example phrase is a list of references to data structures representing the words "print", "the" and "file". No indication exists of the meaning intended for each word. For instance, the word "file" has at least two meanings, both as the verb "to file", and the noun "a file".

Figure 2:
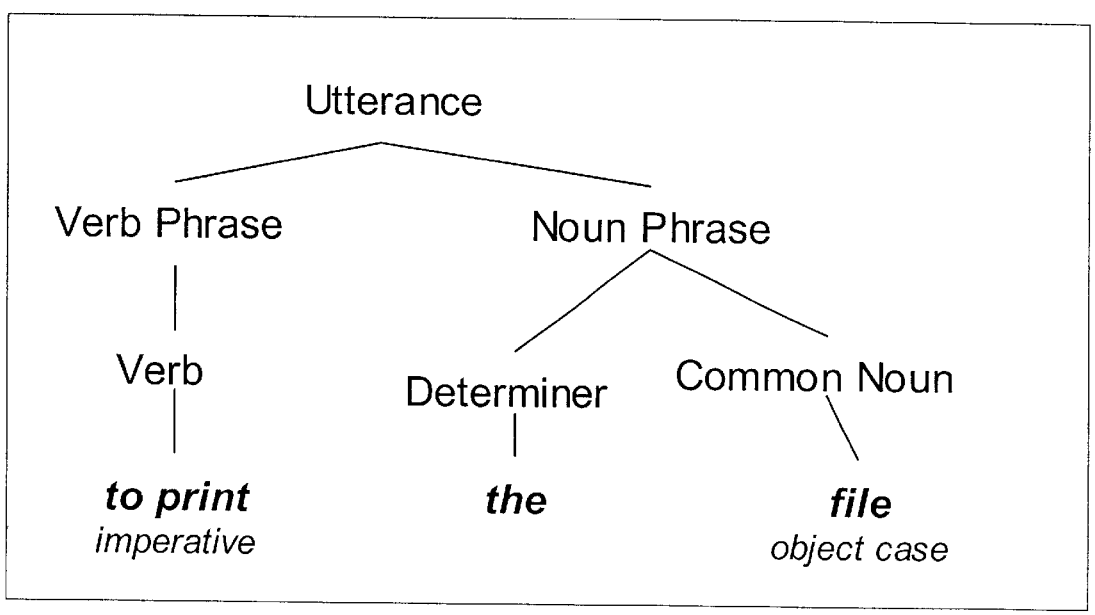
FIG. 2 is a diagrammatic illustration of a tree-like structure used in the present invention.

The format phrases 18 is a tree-like representation 30, FIG. 2, of the grammatical structure of a phrase. The leaves or leaf nodes of such a tree-like representation are references to meanings of the constituent words, and conjugation information such as verb tense, noun case, etc. Using this representation, it is not exactly clear which word is used to express each meaning, because any one of several synonyms may be chosen to verbalize a common noun, for instance.

FIG. 2 illustrates a phrase representation 18 of the example phrase, "print the file". Supposing that 'document' is a synonym of 'file' in a given domain, then either word can be used in realizing the phrase.

A logic format representation 20 is similar to predicate logic, a well known basis for the proof of mathematical theorems. In the logic representation 20, all references are had to functions, objects and attributes in an underlying data model. This means that all abstract references, such as "the file", must be resolved to determine which individual file is referred to. The logic representation 20 is language independent, as opposed to the other representations, which are specific to a certain human or spoken language.

The example phrase could in some context be represented as:

print('/etc/passwd')

in a computer language. This is a function call to a function called "print" with the filename "/etc/passwd" as its argument. This assumes that it is resolved that "the file" refers to a file with the name "/etc/passwd", and that there is a function called "print" which corresponds to the verb "print" as it is used in natural language.

With an utterance in a logic representation, it is possible to execute it (by calling the functions with their arguments), evaluate the truth of a statement, or enumerate free variables to answer questions. Performing these operations (execution, evaluation and enumeration) can be done by standard techniques implemented by persons skilled in the art.

For instance, answering the utterance "Is Joe happy?" might be performed by generating the logic statement "isHappy(joe)", and evaluating it by calling the "isHappy" function with the argument "joe", and letting the value of the statement be the Boolean result of this function call. Another possible logic representation might be "mood(joe)=happy".

To answer the question "Who is happy?", the logic representation "isHappy(X)" might be used (where X is an unbound variable). Answering the question would be equivalent to finding for which objects the function "isHappy" has the value true. Another possible logic representation 20 would be "is Happy(X) AND is Person (X)" (interpreting the word "who" to limit the query to persons).

Converting text 12 to words 16 can be accomplished by first using characters which separate words, such as spaces and punctuation, to extract the spelling of each word. In the example, "print the file" would be converted to "print", "the", and "file." These strings can then be used to look up the representations of the words in a dictionary, lexicon, or the like through well known searching and sorting algorithms in the art. Such a conversion is deterministic, meaning that the same text will always yield the same list of words.

Converting words 16 to text 12 consists of concatenating the spelling of the constituent words. In some implementations, words may have several spellings. Examples of this are American and British spelling of "color" vs. "colour". In this case, converting words to text may use different methods to choose which spelling to use, varying in complexity from choosing one at random, to more advanced methods.

Converting sounds 14 to words is what is provided through continuous speech recognition systems. Such systems are available in both commercial and free implementations, including IBM's Viavoice®, Dragon Dictate® from Dragon Systems, and the open source ISIP Artificial Speech Recognition system from the University of Mississippi, and are often based on well known techniques such as Hidden Markov Models (HMMs).

Speech synthesis systems perform conversions from word 16 to sound 14. Such systems can vary in complexity from simply concatenating stored recordings of each word spoken by a person, to advanced synthesis taking prosody and emotions into account. Speech synthesis systems have been available for many years, and include the freely available Festival Speech Synthesis System from the University of Edinburgh.

Converting words 16 to phrases 18 is known as parsing and is accomplished by a device known as a parser. Parsing is a classical task in computer science and linguistics. Grammar is used to specify possible word sequences, and a parser matches words to possible sequences using the grammar. Grammars can take many forms. Deterministic grammars, using the common Backus Naur Form (BNF) notation, probabilistic n-gram grammars and Head-Driven Phrase Structure Grammars are some examples.

Converting a phrase 18 structure to words 16 consists of traversing the tree-like representation 30 from left to right, in this embodiment, and converting each leaf node to a word. To convert a node to a word, look-up tables together with information about conjugation of verbs, noun cases, etc., can be used to select words which can represent a given meaning.

A primary issued in going from a phrase 18 to logic 20 involves to resolve or bind verb phrases to functions and noun phrases to objects in the underlying data model. Binding verb phrases to functions can be accomplished by using a look-up table relating each verb to one or possibly several functions implementing the functionality of that verb. Different interpretations of the same verb may reduce ambiguity by the number and type of phrase arguments that it takes. The exact mechanisms for such resolution may be realized in different ways for person skilled in the art.

Resolving noun phrases to objects may require tracking recently mentioned objects, i.e., to now which file "the file" refers to in the example phrase. The exact mechanism for doing this is known to persons skilled in the art.

Going from logic 20 to phrase 18 uses and requires knowledge of the grammar of the language, word order, and the like, to create a phrase expressing the same semantics as the original logic form. Similarly to the resolution of noun phrases, tracking recently mentioned objects can help in good logic-to-phrase conversion. This can for instance recognize when the pronoun "it" can be used instead of generating a long description of the object.

In order to make use of the present invention an apparatus including converting means to go from text to words which uses characters which separate words, converting means to go from words to text which concatenates the spelling of the constituent words, converting means to go from sounds to words using a continuous speech recognition system, converting means to go from words to sounds using a speech synthesis system, converting means to go from words to phrases which uses parsing, converting means to go from phrases to words which traverses the tree-like representation and converts each leaf node to a word, converting means to go from phrases to logic which resolves or binds verb phrases to functions and noun phrases to objects in the underlying data model and converting means to go from logic to phrases which uses knowledge of the grammar of the language used to create a phrase expressing the same semantics as the original logic form.

The converting means mentioned in the present description can be software or a combination of hardware and software. The hardware may be a computer and peripheral devices.

The present invention has been described with non-limiting examples and embodiments. It is the attached set of claims that describe all possible embodiments for a person skilled in the art.

What is claimed is:

1. A method for conversion between data representation formats comprising the steps of:

providing data in sound or text information;

providing said data representation formats as text, sound, words, phrases, and logic combined as conversions between text or sounds to words or vice versa, words to phrases or vice versa, and phrases to logic or vice versa, and the formats include a string of characters in the text format, a digital representation of an acoustic waveform in the sound format, a reference to a data structure containing information about a word in the words format, a tree-like representation of the grammatical structure of a phrase in said phrases format, whereby leaf nodes of the tree-like representation are references to meanings of constituent words, and conjugation information, and references to functions, objects and attributes in an underlying data model in the logic format;

converting text to words by using characters which separate words;

converting words to text by concatenating the spelling of the constituent words;

converting sounds to words by providing a continuous speech recognition system;

converting words to sounds by providing a speech synthesis system;

converting words to phrases by parsing;

converting phrases to words by traversing said tree-like representation and converting each leaf node to a word;

converting phrases to logic by resolving or binding verb phrases to functions and noun phrases to objects in said underlying data model;

converting logic to phrases by using knowledge of the grammar of the language used to create a phrase expressing the same semantics as the original logic form;

said logic being provided an utterance in a logic representation format and executing, evaluating or enumerating said utterance through said references to functions, objects and attributes in said underlying data model; and providing computer word processing and sound processing means.

2. The method according to claim 1, including the step of:

transforming linguistic utterances by a user to semantics.

3. The method according to claim 1 wherein said logic format is converted into another human language.

4. The method according to claim 2, wherein said logic format is converted into another human language.

5. The method according to claim 1, wherein converting text to words is accomplished by first using characters which separate words to extract the spelling of each word and then using the results to look up the representations of the words in searching and sorting processes.

6. The method according to claim 2, wherein converting text to words is accomplished by first using characters which separate words to extract the spelling of each word and then using the results to look up the representations of the words in searching and sorting processes.

7. The method according to claim 3, wherein converting text to words is accomplished by first using characters which separate words to extract the spelling of each word and then using the results to look up the representations of the words in searching and sorting processes.

8. The method according to claim 4, wherein converting text to words is accomplished by first using characters which separate words to extract the spelling of each word and then using the results to look up the representations of the words in searching and sorting processes.

9. The method according to claim 1 wherein converting phrases to words consists of traversing said tree-like representation in one direction, and converting each leaf node to a word.

10. The method according to claim 1, wherein resolving noun phrases to objects uses the tracking of recently mentioned objects.

11. A word and sound processor apparatus comprising:

data representation formats including text, sound, words, phrases and logic;

a string of characters in the text format;

a digital representation of an acoustic wave form in the sound format;

a reference to a data structure containing information about a word in the words format;

a tree-like representation of the grammatical structure of a phrase in said phrases format, whereby the leaf nodes of the tree-like representation are references to meanings of constituent words, and conjugation information;

references to functions, objects and attributes in an underlying data model in the logic format;

data including sound or text information receivable by said data representation formats;

means for converting text to words which uses characters which separate words;

means for converting words to text which concatenates the spelling of the constituent words;

means for converting sounds to words including a continuous speech recognition system;

means for converting words to sounds including a speech synthesis system;

means for converting words to phrases which uses parsing;

means for converting phrases to words which traverses said tree-like representation and converts each leaf node to a word;

means for converting phrases to logic which resolves or binds verb phrases to functions and noun phrases to objects in said underlying data model;

said logic being provided an utterance in a logic representation format and executing, evaluating or enumerating said utterance through said references to functions, objects and attributes in said underlying data model; and means for converting logic to phrases, which uses knowledge of the grammar of the language used to create a phrase expressing the same semantics as the original logic format, wherein all said converting means are connected.

12. The apparatus according to claim 11, wherein language independence is provided by transforming linguistic utterances by a user to semantics.

13. The apparatus according to claim 11, wherein said logic format is converted into another human language, thus having the effect of simplistic translation.

14. The apparatus according to claim 12, wherein said logic format is converted into another human language, thus having the effect of simplistic translation.

15. The apparatus according to claim 11, wherein converting text to words is accomplished by first using characters which separate words to extract the spelling of each word and then using the results to look up the representations of the words in searching and sorting processes.

16. The apparatus according to claim 12, wherein converting text to words is accomplished by first using characters which separate words to extract the spelling of each word and then using the results to look up the representations of the words in searching and sorting processes.

17. The apparatus according to claim 13, wherein converting text to words is accomplished by first using characters which separate words to extract the spelling of each word and then using the results to look up the representations of the words in searching and sorting processes.

18. The apparatus according to claim 14, wherein converting text to words is accomplished by first using characters which separate words to extract the spelling of each word and then using the results to look up the representations of the words in searching and sorting processes.

19. The apparatus according to claim 11, wherein converting a phrase structure to words consists of traversing said tree in one direction, and converting each leaf node to a word.

20. The apparatus according to claim 11, wherein resolving noun phrases to objects uses the tracking of recently mentioned objects.

* * * * *